United States Patent … US 9,992,426 B2
Hisa … Date of Patent: Jun. 5, 2018

(54) IMAGE CAPTURING APPARATUS, METHOD FOR CONTROLLING THE SAME, AND STORAGE MEDIUM

(71) Applicant: CANON KABUSHIKI KAISHA, Tokyo (JP)

(72) Inventor: Kenzo Hisa, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/145,212

(22) Filed: May 3, 2016

(65) Prior Publication Data

US 2016/0360085 A1 Dec. 8, 2016

(30) Foreign Application Priority Data

Jun. 5, 2015 (JP) ................................. 2015-115037

(51) Int. Cl.
*H04N 5/235* (2006.01)
*H04N 5/243* (2006.01)
*G06T 5/00* (2006.01)

(52) U.S. Cl.
CPC .......... *H04N 5/2355* (2013.01); *H04N 5/243* (2013.01)

(58) Field of Classification Search
CPC .............. H04N 5/2355; H04N 5/2359; H04N 5/355–5/359; H04N 5/243; G06T 5/007–5/009; G06T 2207/20208
USPC ...... 348/251, 223.1, 229, 222.1, 221.1, 362; 382/169, 237, 254, 276, 298, 299; 345/89, 690; 358/3.03, 3.08, 3.09, 3.1, 358/534, 536, 519; 455/89, 690
See application file for complete search history.

(56) References Cited

U.S. PATENT DOCUMENTS

| | | | | |
|---|---|---|---|---|
| 7,245,781 B2 * | 7/2007 | Gallagher | ............. | H04N 1/407 |
| | | | | 382/162 |
| 7,646,411 B2 * | 1/2010 | Igarashi | ................ | H04N 5/202 |
| | | | | 348/229.1 |
| 7,830,420 B2 * | 11/2010 | Hyoudou | ............... | H04N 5/235 |
| | | | | 348/222.1 |
| 8,582,001 B2 * | 11/2013 | Tzur | .................... | H04N 5/3355 |
| | | | | 348/229.1 |
| 8,798,395 B2 * | 8/2014 | Jo | ...................... | H04N 5/23254 |
| | | | | 382/254 |
| 2008/0094493 A1 | 4/2008 | Igarashi | | |

(Continued)

FOREIGN PATENT DOCUMENTS

| | | |
|---|---|---|
| JP | 2004-120511 A | 4/2004 |
| JP | 2006-081037 A | 3/2006 |

*Primary Examiner* — Lin Ye
*Assistant Examiner* — Marly Camargo
(74) *Attorney, Agent, or Firm* — Fitzpatrick, Cella, Harper & Scinto

(57) ABSTRACT

An image capturing apparatus includes: an image capturing unit for capturing an object image; an expander for expanding the dynamic range of the image capturing unit by reducing the exposure of the image capturing unit; a tone correction unit for performing tone correction on image data; a display unit for displaying a display image obtained by the tone correction unit; a detection unit for detecting signal values of a region within a screen of the image capturing unit after the expander expands the dynamic range; and a control unit for, in the case where the dynamic range is expanded, changing a characteristic of tone correction so as to suppress change in the display image caused by the change in the dynamic range.

12 Claims, 8 Drawing Sheets

(56) References Cited

U.S. PATENT DOCUMENTS

| | | | |
|---|---|---|---|
| 2009/0002513 A1* | 1/2009 | Yoshida | H04N 5/35554 348/222.1 |
| 2010/0201843 A1* | 8/2010 | Fukui | H04N 5/23219 348/229.1 |
| 2012/0314095 A1* | 12/2012 | Fukui | H04N 5/23219 348/220.1 |
| 2013/0076937 A1* | 3/2013 | Tajima | H04N 5/355 348/223.1 |
| 2013/0215314 A1* | 8/2013 | Prentice | H04N 5/23245 348/333.11 |
| 2017/0171446 A1* | 6/2017 | Nashizawa | H04N 5/2352 348/362 |

* cited by examiner

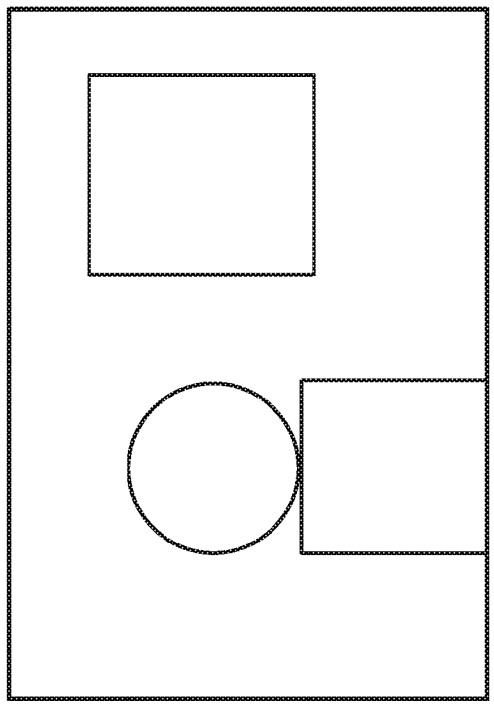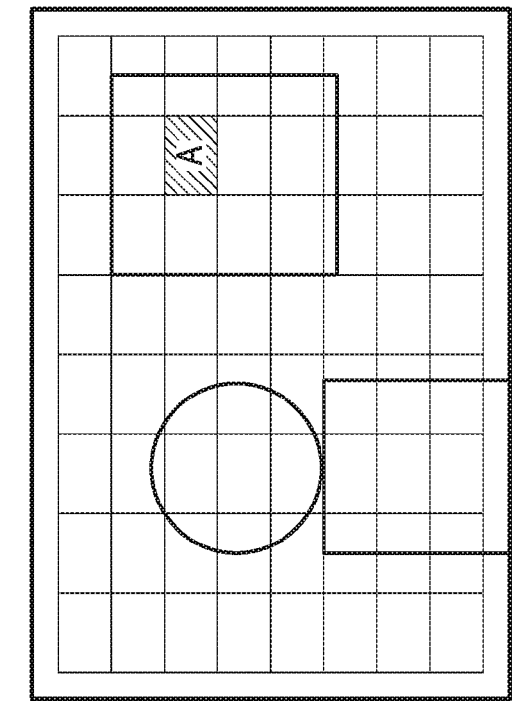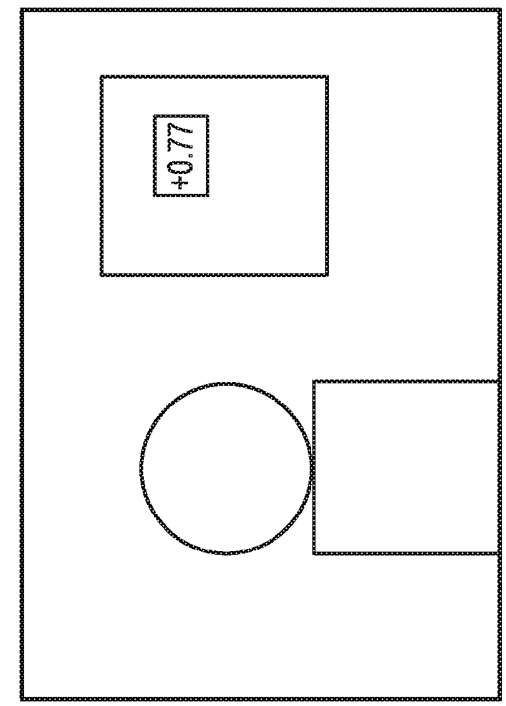

IMAGE CAPTURING APPARATUS, METHOD FOR CONTROLLING THE SAME, AND STORAGE MEDIUM

BACKGROUND OF THE INVENTION

Field of the Invention

The present invention relates to an image capturing apparatus and a method for controlling the same, and, in particular, relates to an exposure control technique.

Description of the Related Art

There is known to be a method for suppressing blown-out highlights (overexposure) and blocked-up shadows (underexposure) and expanding the dynamic range by raising the luminance of a video image shot with an exposure that is lower than the standard exposure (underexposure) by performing gamma correction (tone correction). Gamma correction characteristics are changed in accordance with the dynamic range that is set, such that the relationship between the level of incident light and the level of output signals becomes a relationship that was prepared in advance.

Some methods for expanding the dynamic range and changing gamma correction characteristics have been suggested. Japanese Patent Laid-Open No. 2004-120511 suggests a method for effectively using the tone of a high luminance portion as well by expanding the dynamic range and smoothing the inclination of the tone characteristics of the high luminance portion. According to this method, even in a state where the dynamic range is low, the tone of the high luminance portion can be effectively used by changing the inclination of the tone characteristics of the high luminance portion.

In addition, Japanese Patent Laid-Open No. 2006-81037 suggests a method for shifting the dynamic range in accordance with the maximum reflectance of the incident light amount of an object, and changing gamma correction characteristics so as to correspond to the maximum reflectance, while maintaining output with respect to a reference incident light amount. In this method, in the case where the maximum reflectance is high, the gamma value is brought close to 1, and in the case where the maximum reflectance is low, the gamma value is brought close to 0. Accordingly, if the maximum reflectance is high, the contrast is reduced, and if the maximum reflectance is low, the contrast is increased.

Incidentally, in the case of expanding the dynamic range, the relationship between the level of incident light and the level of output signals is maintained by shooting with underexposure and changing gamma characteristics. This is substantially the same as signal amplification, and causes decrease in the S/N ratio. Therefore, from the viewpoint of the S/N ratio, it is preferred not to perform dynamic range expansion more than necessary. Therefore, in the case where blown-out highlights occur in an image under a certain shooting condition, it is thought that a user will desire the least amount of dynamic range expansion that can resolve the blown-out highlights. However, in the portion with blown-out highlights, the photometric values are also saturated, and it is not possible to specify the level of the incident light in the portion with blown-out highlights. Therefore, there is a problem in that the user cannot figure out a dynamic range expansion amount necessary to avoid the blown-out highlights.

SUMMARY OF THE INVENTION

The present invention has been made in light of the above-described problem, and makes it possible to detect, in an image capturing apparatus, a signal value of a portion in which blown-out highlights (overexposure) has occurred in the case where blown-out highlights (overexposure) has occurred in a display image.

According to a first aspect of the present invention, there is provided an image capturing apparatus comprising: an image capturing unit configured to capture an object image and output image data; an expander configured to expand a dynamic range of the image capturing unit by reducing an exposure of the image capturing unit; a tone correction unit configured to perform tone correction on the image data; a display unit configured to display a display image obtained by the tone correction unit performing tone correction on the image data; a detection unit configured to detect signal values of a region within a screen of the image capturing unit after the expander expands the dynamic range by a predetermined amount; and a control unit configured to, in a case where the dynamic range is expanded by the predetermined amount, change characteristics of the tone correction so as to suppress change in the display image caused by change in the dynamic range by the predetermined amount.

According to a second aspect of the present invention, there is provided a method for controlling an image capturing apparatus that includes an image capturing unit configured to capture an object image and output image data, the method comprising: expanding a dynamic range of the image capturing unit by reducing an exposure of the image capturing unit; performing tone correction on the image data; displaying a display image obtained by performing tone correction on the image data in the tone correction; detecting signal values of a region within a screen of the image capturing unit after the dynamic range is expanded by a predetermined amount in the expanding; and changing, in a case where the dynamic range is expanded by the predetermined amount, a characteristic of the tone correction so as to suppress change in the display image caused by change in the dynamic range by the predetermined amount.

Further features of the present invention will become apparent from the following description of exemplary embodiments with reference to the attached drawings.

BRIEF DESCRIPTION OF THE DRAWINGS

FIGS. 6A to 6C are diagrams showing an example of a photometric frame for an image and display thereof in the first and second embodiments.

DESCRIPTION OF THE EMBODIMENTS

Embodiments of the present invention will be described below in detail with reference to accompanying drawings.

First, an overview of the embodiments of the present invention will be described. As a method for, in the case of capturing a moving image with a video camera, suppressing blown-out highlights (overexposure) that are a phenomenon in which a region in an image (screen) that corresponds to a high luminance object is unnaturally bright due to the high luminance object being overexposed, there is a method of using underexposure and raising the sensitivity to expand the dynamic range. However, in the case where blown-out highlights occur with the current exposure, a user cannot figure out what degree of dynamic range expansion is required to be able to avoid the blown-out highlights. In other words, the user cannot figure out what degree of underexposure the exposure is required to be changed to so as to be able to suppress the blown-out highlights. This is because the signals in the portion with blown-out highlights are saturated in the image data, and is due to the camera not being able to detect the highest value of the signal level of that portion.

In view of this, in these embodiments, a wide range of values are temporarily set for the dynamic range during shooting. Accordingly, the saturation is eliminated in the portion that had had blown-out highlights, and it becomes possible to detect the highest value of the signals in the portion. In other words, it is possible to obtain the difference between the highest value of a signal that can be expressed within the dynamic range that has been set so far and the highest value of the signals in the portion that had blown-out highlights. It can then be seen that the blown-out highlights can be avoided if the dynamic range is expanded by this difference, which can be notified to the user. However, if the exposure is changed to the underexposure side in an attempt to expand the dynamic range during shooting as described above, the change in exposure is reflected in the image, and the user will see an unnatural image in which the brightness changes. Therefore, in these embodiments, the operation of expanding the dynamic range during shooting is accompanied by a change in the gamma characteristics of the image. Subsequently, even after expanding the dynamic range, a video image (display image) that was generated by changing the gamma characteristics has blown-out highlights that appear to be substantially the same as before expanding the dynamic range is displayed. Accordingly, it is possible to find out the highest value of the signals in the portion with blown-out highlights, and it is possible to avoid the case where the displayed video image becomes unnatural. The above description is an overview of the embodiments of the present invention.

First Embodiment

Figure 1:
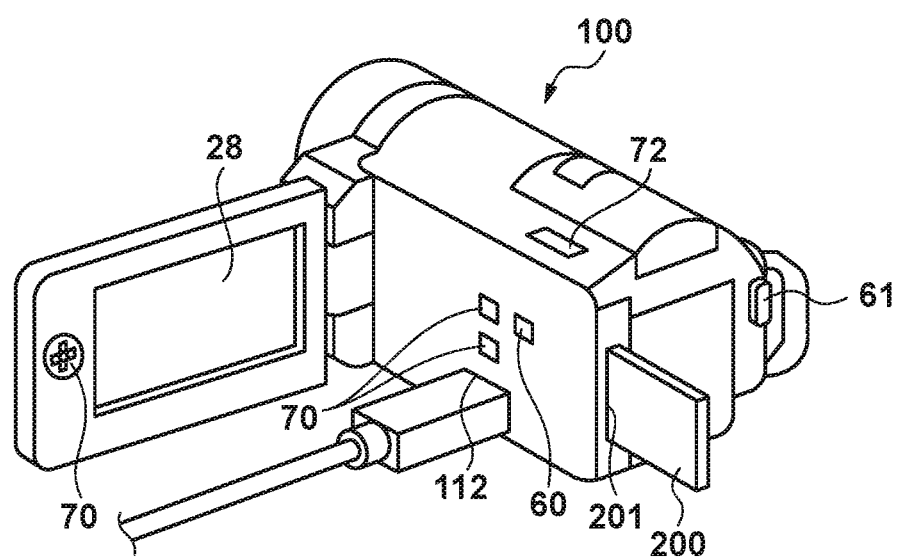
FIG. 1 is a diagram of the appearance of a digital video camera in first and second embodiments.

FIG. 1 is a diagram showing the appearance of a digital video camera 100, which is a first embodiment of an image capturing apparatus of the present invention. In FIG. 1, a display unit 28 is a display unit for displaying images and various types of information. A video recording switch 61 is an operation unit for giving a shooting instruction. A mode changing switch 60 is an operation unit for switching various modes. A connector 112 is a connector for connecting a connection cable to the digital video camera 100. An operation unit 70 is an operation unit provided with operation members such as various buttons and a cross key for accepting various operations from a user. A power supply switch 72 switches between on and off of a power supply. A recording medium 200 is a recording medium such as a memory card or a hard disk. A recording medium slot 201 is a slot for storing the recording medium 200. The recording medium 200 can communicate with the digital video camera 100 by being stored in the recording medium slot 201.

Figure 2:
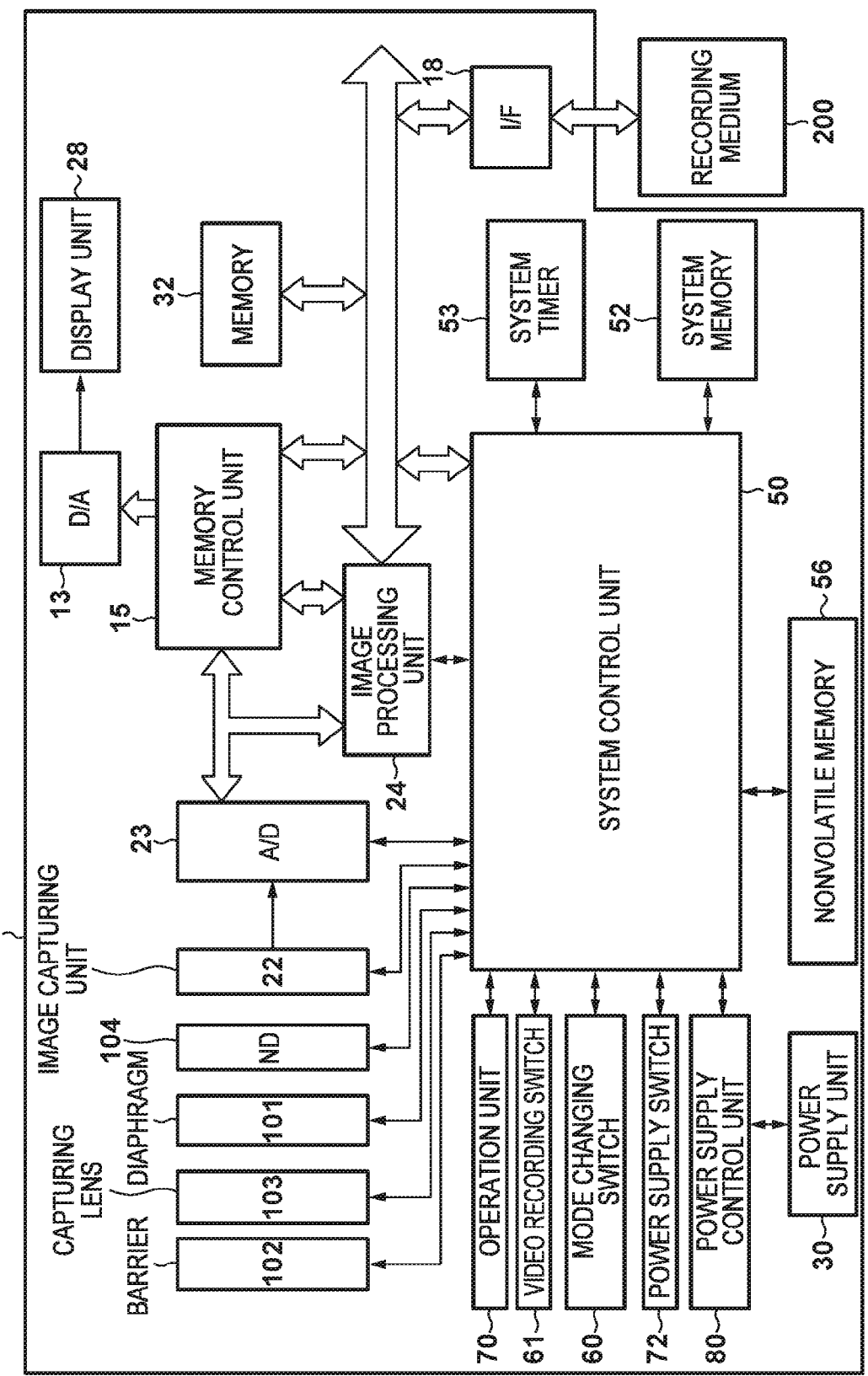
FIG. 2 is a block diagram showing a configuration of the digital video camera in the first and second embodiments.

FIG. 2 is a block diagram showing the internal configuration of the digital video camera 100 of the first embodiment. In FIG. 2, a capturing lens 103 is a lens group including a zoom lens and a focus lens, and forms object images. A diaphragm 101 is a diaphragm used for light amount adjustment. An ND filter (Neutral Density Filter) 104 is a filter used for light reduction. An image capturing unit 22 has an image sensor that is constituted by a CCD, a CMOS sensor or the like for converting optical images into electric signals. The image capturing unit 22 also has functions such as storage control using an electronic shutter, changing an analog gain, changing a reading speed and the like. An A/D converter 23 converts analog signals into digital signals. The A/D converter 23 is used for converting analog signals output from the image capturing unit 22 into digital signals. The barrier 102 prevents soiling and damage of an image capturing system including the capturing lens 103, the diaphragm 101 and the image capturing unit 22 by covering the image capturing system including the capturing lens 103, within the digital video camera 100.

An image processing unit 24 performs, on data from the A/D converter 23 or data from a memory control unit 15, processing including resize processing such as predetermined pixel interpolation processing and reduction processing, color conversion processing, gamma correction processing, digital gain addition processing and the like. Predetermined calculation processing is also performed using captured image data, and the calculation result is transmitted to a system control unit 50. Based on the transmitted calculation result, the system control unit 50 performs exposure control, distance measurement control, white balance control and the like. Accordingly, TTL (through the lens) AF (autofocus) processing, AE (automatic exposure) processing, AWB (automatic white balancing) processing and the like are performed.

Output data from the A/D converter 23 is written to the memory 32 via the image processing unit 24 and the memory control unit 15 or directly via the memory control unit 15. The memory 32 stores image data captured by the image capturing unit 22 and converted into digital data by the A/D converter 23, as well as image data to be displayed on the display unit 28. The memory 32 is provided with a storage capacity sufficient for storing moving images and sound for a predetermined period of time.

The memory 32 also serves as a memory for image display (video memory). A D/A converter 13 converts image display data stored in the memory 32 into analog signals, and supplies the analog signals to the display unit 28. Thus, the image display data written to the memory 32 is displayed by the display unit 28 via the D/A converter 13. The display unit 28 performs, on a display device such as an LCD, display that is based on the analog signals from the D/A converter 13. Digital signals that were A/D converted by the A/D converter 23 and stored in the memory 32 are analog-converted by the D/A converter 13, and are successively transferred to the display unit 28 and displayed, thereby realizing an electronic view finder, making it possible to display a through-the-lens image.

A nonvolatile memory 56 is an electrically erasable and recordable memory, and an EEPROM is used, for example.

The nonvolatile memory 56 stores constants, programs and the like for operation of the system control unit 50. The programs here are programs for executing various flowcharts, which will be described later.

The system control unit 50 controls the entire digital video camera 100. By executing the programs recorded in the above-described nonvolatile memory 56, various types of processing of this embodiment, which will be described later, are executed. A RAM is used for a system memory 52. Constants and variables for operation of the system control unit 50, programs read out from the nonvolatile memory 56 and the like are loaded in the system memory 52. The system control unit 50 also performs display control by controlling the memory 32, the D/A converter 13, the display unit 28 and the like.

A system timer 53 is a clocking unit that clocks times used for various types of control and the time of an incorporated clock. The mode changing switch 60, the video recording switch 61 and the operation unit 70 are operation units for inputting various operation instructions to the system control unit 50.

The mode changing switch 60 switches the operation mode of the system control unit 50 to one of a moving image recording mode, a still image recording mode, a reproduction mode and the like. As modes included in the moving image recording mode and the still image recording mode, there are an auto shooting mode, an automatic scene determination mode, a manual mode, various scene modes in which shooting settings are made for each shooting scene, a program AE mode, a custom mode and the like. By operating the mode changing switch 60, it is possible to switch directly to one of these modes included in the moving image recording mode. Alternatively, the mode changing switch 60 may be used to switch the moving image recording mode, and thereafter another operation member may be used to switch to one of the modes included in the moving image recording mode. The video recording switch 61 switches between a shooting stand-by state and a shooting state. When the video recording switch 61 is turned on, the system control unit 50 starts a series of operations from reading out signals from the image capturing unit 22 to writing moving image data to the recording medium 200.

By selecting and operating various function icons displayed on the display unit 28, for example, functions appropriate to the situation are assigned to the operation members of the operation unit 70, and the operation members then operate as various function buttons. The function buttons include an END button, a BACK button, an image scrolling button, a JUMP button, a narrow-down button, an attribute changing button and the like. For example, when a menu button is pressed, a menu screen that enables various settings to be changed is displayed on the display unit 28. An operator can intuitively perform various settings using the menu screen displayed on the display unit 28, a four directional (up, down, right and left) cross key and a SET button.

A power supply control unit 80 is constituted by a battery detection circuit, a DC-DC converter, a switch circuit for switching blocks to be energized, and the like, and detects whether a battery is mounted, the type of battery, and the battery remaining capacity. The power supply control unit 80 also controls the DC-DC converter based on the detection result and an instruction from the system control unit 50, and supplies a necessary voltage to the units including the recording medium 200 for a necessary period of time.

A power supply unit 30 is constituted a primary battery such as an alkaline battery or a lithium battery, a secondary battery such as a NiCd battery, a NiMH battery or a Li ion battery, an AC adaptor, or the like. A recording medium I/F 18 is an interface with the recording medium 200 such as a memory card or a hard disk. The recording medium 200 is a recording medium such as a memory card for recording shot images, and is constituted by a semiconductor memory, a magnetic disk or the like.

Next, the operations of the digital video camera of this embodiment will be described. In this embodiment, in the case where a portion of a video image that is currently being shot has blown-out highlights (is overexposed), the digital video camera 100 can display the difference between the highest value of the signal values in this portion with blown-out highlights and the highest value of a signal that can be expressed within the dynamic range that is currently set. The user can see that the blown-out highlights in the image can be avoided if the dynamic range is expanded (the degree of underexposure is increased) by this displayed difference. This function will be referred to as D range assist.

In this embodiment, in order to detect the highest value of the signal values of the portion with blown-out highlights, the dynamic range (hereinafter referred to as the D range) is temporarily expanded to the maximum value that can be set with the digital video camera 100. Accordingly, saturation of the signals in the portion with blown-out highlights is eliminated, and the highest value of the signal values of the portion with blown-out highlights can be detected. At this time, underexposure is used in order to expand the D range, but if this change in exposure appears in a displayed image, the user will see a unnatural image in which the brightness changes. In order to avoid this, gamma correction characteristics are adjusted so as to display an image that seems as if the exposure has not been changed, and which is overexposed in the same manner as before expanding the dynamic range. Note that various types of processing in this embodiment are realized by the system control unit 50 loading programs stored in the nonvolatile memory 56 to the system memory 52 and executing the programs.

Figure 3:
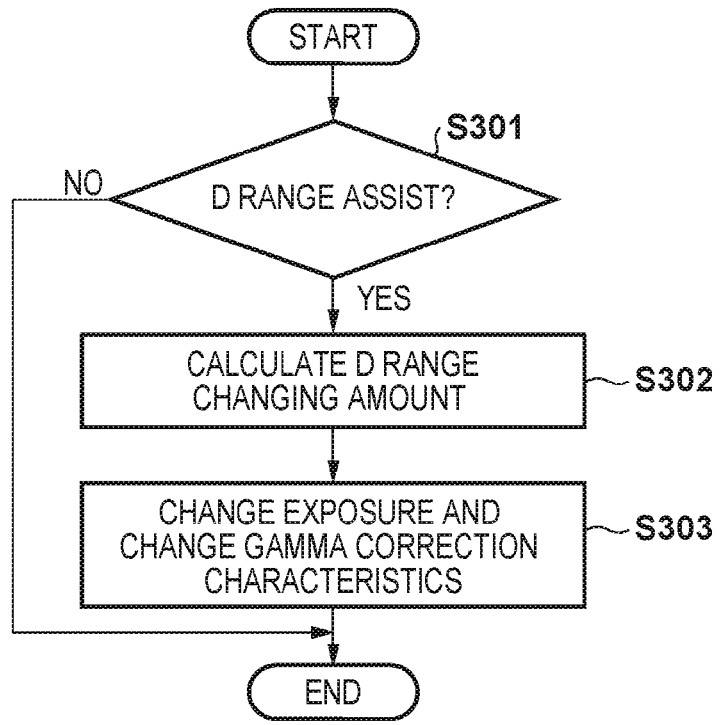
FIG. 3 is a flowchart showing determination processing for determining exposure and gamma correction characteristics in the first embodiment.

Processing for changing exposure and gamma correction characteristics in accordance with a D range to be set (in this embodiment, Dmax) will be described below. FIG. 3 is a flowchart showing the operations of exposure and gamma correction characteristics determination processing in this embodiment.

First, in step S301, it is determined whether or not D range assist is enabled. Enabling and disabling of D range assist is set by the user using the operation unit 70. If D range assist is disabled, this flow is ended without performing the following processing. If D range assist is enabled, the amount by which the D range is to be changed (hereinafter, referred to as the D range changing amount) is calculated in step S302. In this embodiment, assume that the D range is changed to Dmax, which is the maximum D range that can be set with the digital video camera 100. Letting the current D range be Dnow, and the D range after being changed be Dmax, Dchange, which is the number of stages of the D range changing amount, is expressed by Expression 1.

$$D\text{change} = \log_2(D\text{max}/D\text{now}) \qquad \text{Exp. 1}$$

For example, if the maximum D range that can be set is 800%, and the current D range is 400%, the D range changing amount is one stage. If the current D range is 300%, the D range changing amount is approximately 1.52 stages.

Next, in step S303, the exposure and gamma correction characteristics are changed in accordance with the D range changing amount calculated in step S302. The exposure is changed using the diaphragm 101, the ND filter 104, the electronic shutter in the image capturing unit 22, an analog gain or the like. For example, in the case of changing the electronic shutter speed, if the electronic shutter speed before changing the D range is 1/60 second, and the D range changing amount is one stage, the electronic shutter speed is changed to 1/120 second. The method for changing the exposure is arbitrary as long as it is a method that makes it possible to change the exposure to the exposure before the signals are output from the image sensor, and the method for changing the exposure is not particularly limited to the method using an electronic shutter.

In addition, in step S303, when the D range is changed, the gamma correction characteristics to be set for a gamma correction circuit inside the image processing unit 24 are also changed at the same time. Letting Y be the output (output signals of the image sensor) for the input (light intensity) X after expanding the D range and before changing the gamma correction characteristics, the gamma correction characteristics are changed such that the output of X×Dnow/Dmax is Y. In addition, letting the highest value of the input before changing the gamma correction characteristics be Xmax, and the maximum value of the output be Ymax, the gamma correction characteristics are changed such that the output is Ymax when the input is Xmax×Dnow/Dmax after changing the gamma correction characteristics, and the output for the input after that is Ymax.

Figure 4:
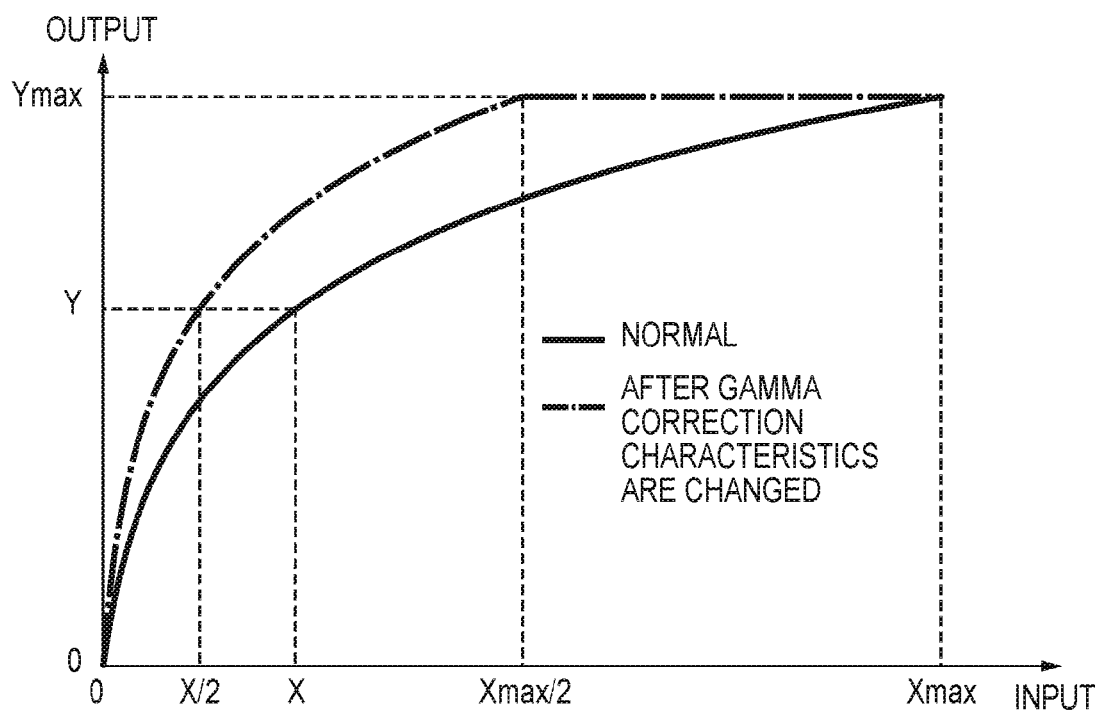
FIG. 4 is a diagram showing an example of gamma correction characteristics before and after D range assist in the first embodiment.

FIG. 4 is a diagram showing an example of the relationship between input and output of gamma correction characteristics before and after expanding the D range. FIG. 4 is an example of the case in which Dnow is 400% and Dmax is 800%. The horizontal axis indicates input bits (light intensity) of the gamma correction circuit, and the vertical axis indicates output bits. Before expanding the D range, a signal of 400% is the maximum value of the D range, that is, Xmax. Also, after expanding the D range, a signal of 800% is the maximum value of the D range, that is, Xmax, and the signal of 400% is Xmax/2.

If the D range is expanded without changing the normal gamma correction characteristics, underexposure occurs, the image becomes dark, and blown-out highlights (overexposure) are eliminated. That is, the video image being displayed changes. In order to prevent the user from seeing this change, the gamma correction characteristics are changed. Specifically, Dnow/Dmax is ½ (=400%/800%), and thus the gamma correction characteristics are changed such that the output for the input X before changing the gamma correction characteristics is the same as the output for the input X/2 after changing the gamma correction characteristics. In addition, after being changed, the gamma correction characteristics are Ymax at the time of Xmax/2, and is maintained at Ymax after that. This set value based on the gamma correction characteristics is transmitted to the image processing unit 24, and is set in the gamma correction circuit.

Figure 5:
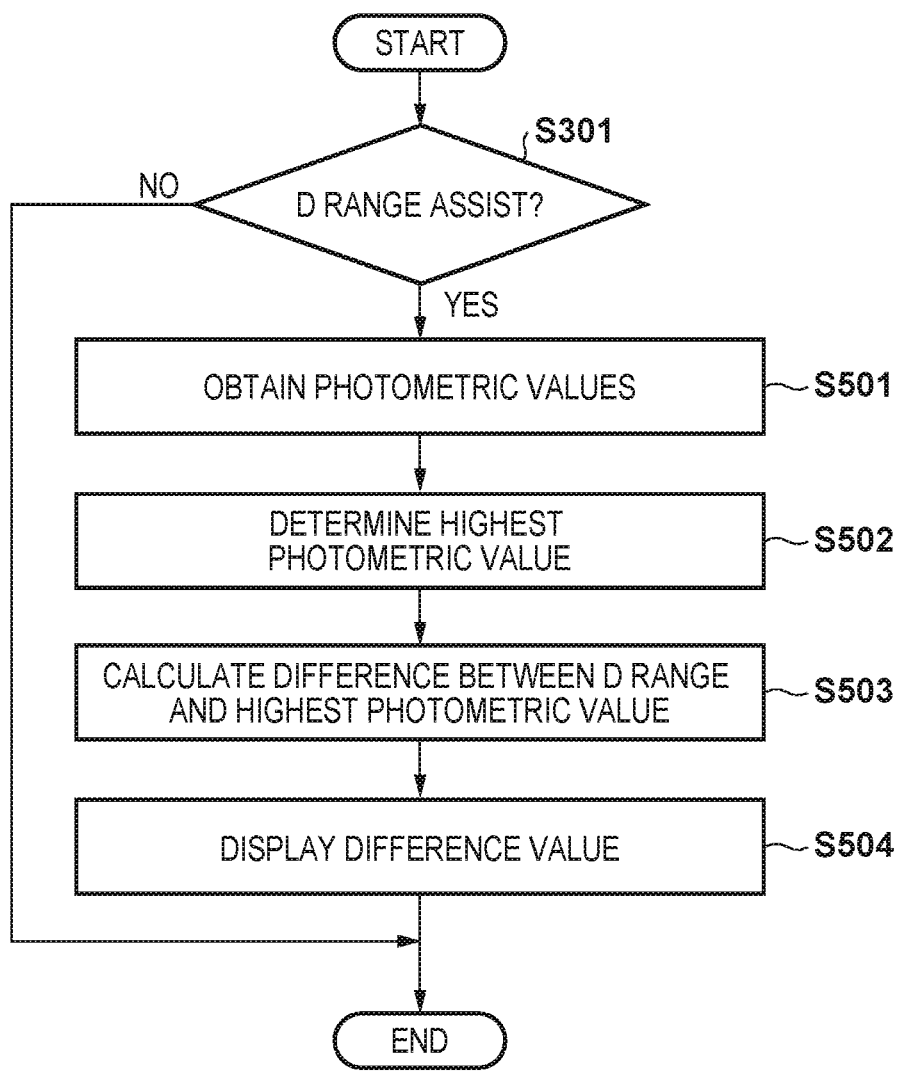
FIG. 5 is a flowchart showing display processing for displaying a difference value in the first embodiment.

By expanding the D range as described above, it is possible to find out the signal values of the portion with blown-out highlights in a state where the D range is widened before being input into the gamma correction circuit. Processing for calculating the difference between the highest value of signals obtained after expanding the D range and the maximum value of a signal that can be expressed within the D range before being expanded will be described below. FIG. 5 is a flowchart showing the operations of calculating and further displaying this difference value.

First, similarly to the case in FIG. 3, it is determined in step S301 whether or not D range assist is enabled. If D range assist is disabled, this flow is ended without performing the following processing. If D range assist is enabled, in step S501, a photometric value (the highest photometric value) of the portion with blown-out highlights that became detectable by expanding the D range and photometric values of the other portions are obtained. In the image processing unit 24, this photometric value is calculated from image data after expanding the D range and before passing through the gamma correction circuit.

A photometric value is a value obtained by separating (dividing) image data (within the screen) into a plurality of frames of a specific size and calculating the average value of the luminance signals of image data in a separated frame. In this embodiment, assume that the image data is separated into 8×8 frames (regions). FIGS. 6A to 6C are diagrams showing an example of arrangement of photometric frames and display thereof with respect to an image. FIG. 6A shows the image in which photometry is performed, and FIG. 6B shows the image and the photometric frames. The system control unit 50 averages the luminance values for each of 64 photometric frames, and obtains 64 luminance average values. In this embodiment, the photometric value is assumed to be the average value of the luminance signals, but it is sufficient that the brightness of each of the frames is known, and the brightness may be expressed by an integrated value, or may be expressed by a value that serves as in indicator of brightness such as an EV value.

Next, in step S502, the highest photometric value is determined. The highest value among the above 64 photometric values is extracted, and is stored along with the position of the frame. Next, in step S503, the difference between the maximum value of a signal that can be expressed within the current D range and the highest photometric value is calculated. The difference value is calculated by Expression 2 below.

difference value=$\log_2$(highest photometric value/ (maximum value×current D range/maximum D range)) Exp. 2

For example, if the current D range be 400%, the maximum D range is 800%, the maximum value is 4095, and the highest photometric value is 3500, the difference value is approximately 0.77 stages. In other words, if the D range is changed by 0.77 stages so as to be the D range of approximately 680%, the highest photometric value falls within the range of maximum values that can be expressed within the D range. In addition, there is a possibility that exposure correction corresponding to 0.77 stages becomes necessary at the same time, and that the S/N ratio decreases by the amount.

Lastly, in step S504, the difference value is displayed. The system control unit 50 transmits the position of the photometric frame that shows the highest photometric value and the difference value to the image processing unit 24. In the image processing unit 24, the image of the frame is rendered in accordance with the position of the frame, an image showing the difference value in that frame is generated, and an image obtained by superimposing that image on the image data is generated. The image data passes through the memory control unit 15 and the D/A converter 13 and is displayed on the display unit 28. FIG. 6C shows a display example of the difference value. It is an example of the case in which the photometric value of a frame A shown in FIG. 6B is the highest photometric value. Due to this display of the difference value, it can be seen that change of the D range by 0.77 stages is required in order to bring the object of the frame A within the D range. Note that in this embodiment, the example in which the difference value is displayed in the frame was described, but the method for displaying the frame and the location in which the numerical value is displayed are arbitrary, and are not particularly limited to the example in FIG. 6C.

By detecting the photometric value using the method as described above, as long as the photometric value is within the range of the maximum D range that can be set with the digital video camera 100, even if the photometric value is a photometric value that is out of the current D range, it is possible to find out the relationship between the maximum value of the current D range and the highest photometric value. Therefore, the photometric value can be used as a guide when the user changes the D range.

Second Embodiment

In the first embodiment, an example is described in which, in the case where D range assist is enabled, gamma correction characteristics are changed in the state where the D range is maximized, such that the relationship between incident light and the output for the incident light is substantially the same as before expanding the D range, and images appear as if the images have not been changed in the displayed video. However, expanding the D range is substantially the same as increasing the gain, and thus the S/N ratio deteriorates in accordance with the amount of expansion. In other words, a sense of noise differs before and after executing D range assist. Therefore, in this embodiment, an example will be described in which in the case of executing D range assist, the amount of expansion of the D range is lessened as much as possible, rather than setting the D range to the maximum value that can be set.

Figure 7:
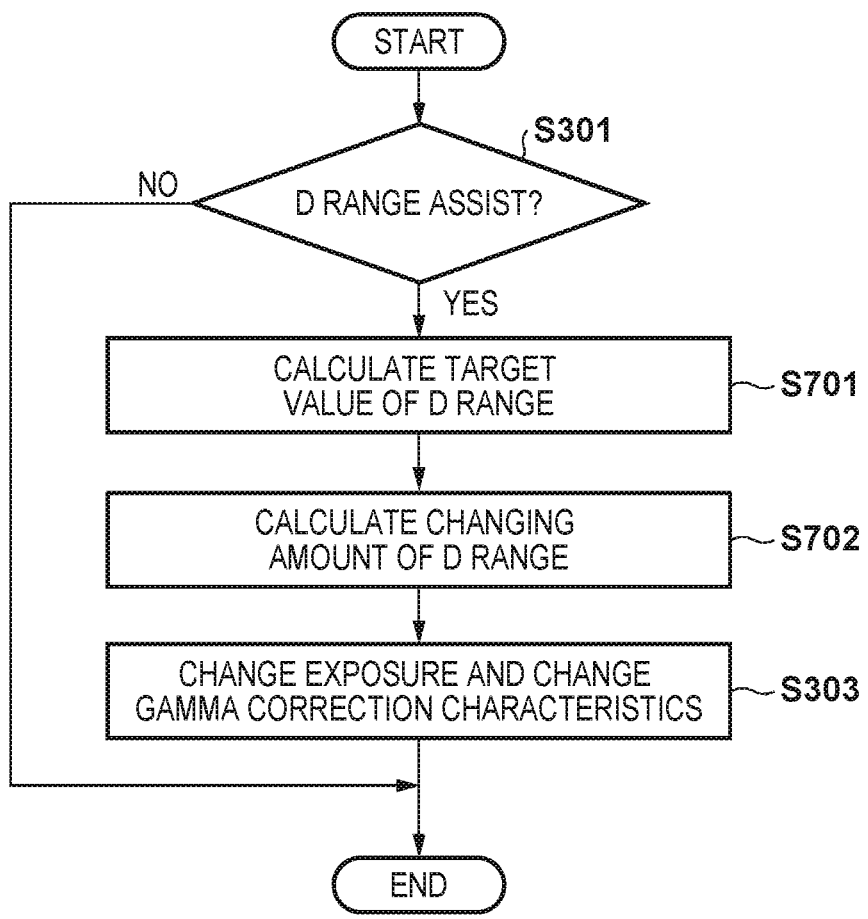
FIG. 7 is a flowchart showing determination processing for determining exposure and gamma correction characteristics in the second embodiment.

The appearance and configuration of the image capturing apparatus is the same as the configuration in FIGS. 1 and 2 described in the first embodiment, and thus the description thereof is omitted. FIG. 7 is a flowchart showing the operations of exposure and gamma correction characteristics determination processing in this embodiment.

First, similarly to the first embodiment, it is determined in step S301 whether or not D range assist is enabled. If D range assist is disabled, this flow is ended without performing the following processing. If D range assist is enabled, photometric values are detected, and the target value of the D range is calculated based on the photometric values, in step S701. Note that here, it is assumed that photometric values of 8×8=64 frames are obtained similar to the first embodiment. The photometric values may be partially saturated. In addition, calculation of the target value of the D range will be described later.

Next, in step S702, the number of stages of the D range changing amount (Dchange) is calculated from the current D range (Dnow) and the calculated target value of the D range (Dtarget), using Expression 3 below.

$$D\text{change} = \log_2(D\text{target}/D\text{now}) \quad \text{Exp. 3}$$

Next, in step S303, the exposure and the gamma correction characteristics are changed in accordance with the D range changing amount calculated in step S702. The exposure is changed using the diaphragm 101, the ND filter 104, the electronic shutter in the image capturing unit 22, the analog gain or the like, similarly to the first embodiment.

On the other hand, when the exposure is changed in order to change (specifically, expand) the D range, underexposure occurs and the image changes. In order to prevent the user from seeing this, the gamma correction characteristics are changed. The gamma correction characteristics are changed according to which the relationship between the input X and output corresponding thereto before changing the gamma correction characteristics is the same as the relationship between the input X×Dnow/Dtarget and output corresponding thereto after changing the gamma correction characteristics. In addition, the gamma correction characteristics after being changed become Ymax at the time of Xmax×Dnow/Dtarget, and Ymax is maintained after that.

Figure 8:
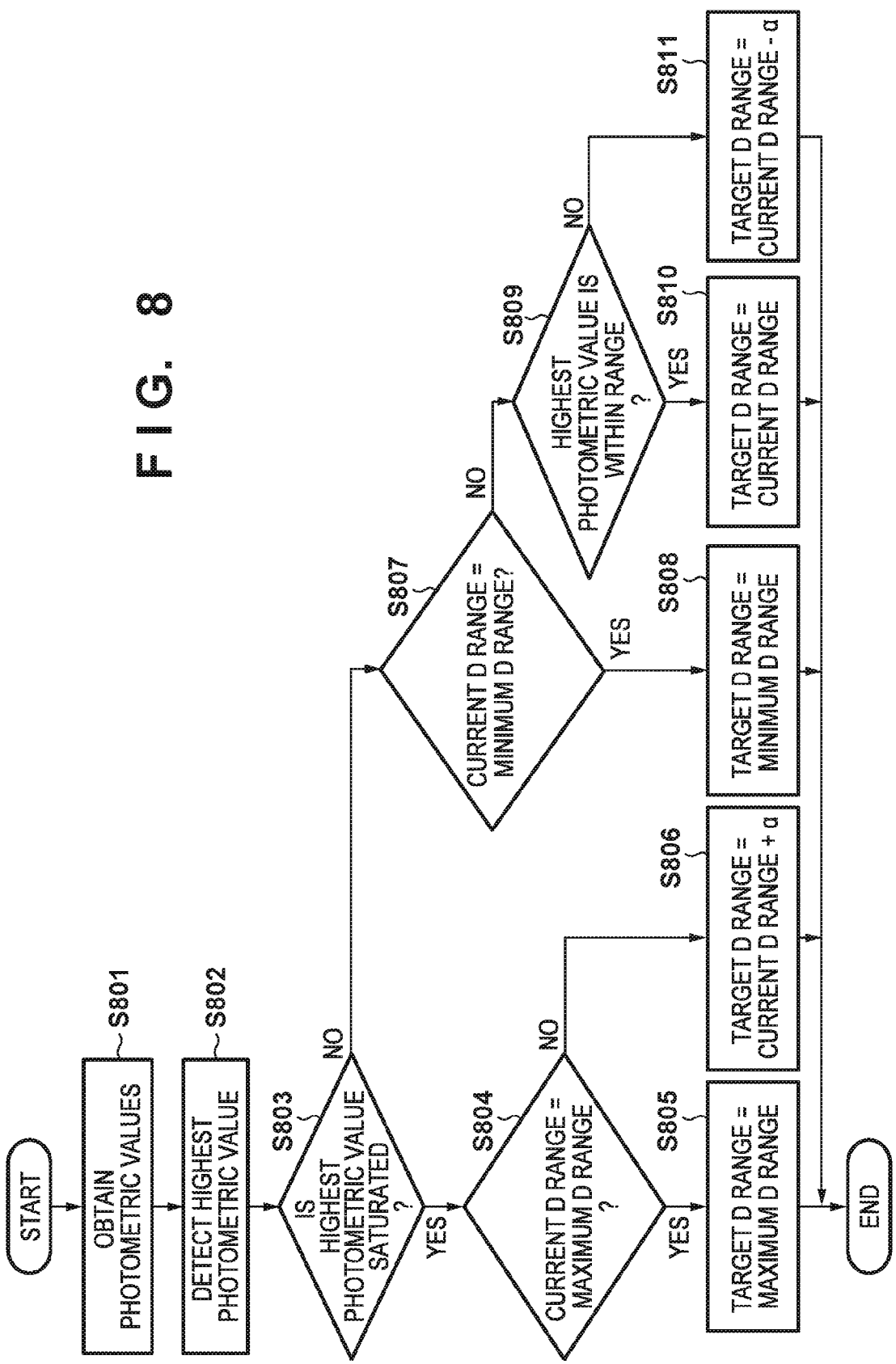
FIG. 8 is a flowchart showing determination processing for determining a target dynamic range in the second embodiment.

Next, a method for calculating the target value of the D range in step S701 will be described. FIG. 8 is a flowchart showing an operation of calculating the target value of the D range.

First, in step S801, photometric values are obtained. Similarly to the first embodiment, photometric values for 8×8=64 frames are obtained. Next, in step S802, the highest value among the photometric values for the 64 frames is detected.

Next, in step S803, it is determined whether or not the highest photometric value is saturated. If the photometric value is 12 bits, it is determined whether or not the photometric value is 4095, that is the maximum value that can be expressed with 12 bits. Saturation determination may be performed based on a flexible range. For example, it may be determined that the highest photometric value is saturated if it is greater than or equal to 4000.

If it is determined in the determination in step S803 that the highest photometric value is saturated, it is determined in step S804 whether or not the current D range is the maximum D range (Dmax). If the current D range is the maximum D range, it is not possible to expand the D range any further even if the photometric value is saturated, and thus in step S805 the target D range is set to be the maximum D range. In other words, the current D range is maintained. If it is determined in the determination in step S804 that the current D range is not the maximum D range, the D range can be expanded, and thus the D range is increased by a fixed value (constant value) α. For example, letting α be current D range×1/20, and the current D range be 700%, the target D range is assumed to be 735%.

If it is determined in the determination in step S803 that the highest photometric value is not saturated, it is determined in step S807 whether or not the current D range is the minimum D range. This is because it is conceivable that the current D range is excessively broad if the highest photometric value is not saturated, and thus reduction of the D range is also considered. If it is determined in the determination in step S807 that the current D range is the minimum D range, the D range cannot be reduced any further, and thus the target D range is assumed to be the minimum D range in step S808. In other words, current D range is maintained.

If it is determined in the determination in step S807 that the target D range is not the minimum D range, it is determined in step S809 whether or not the highest photometric value is within a predetermined range. This predetermined range is a range close to the maximum value of the D range. If the highest photometric value is in a state close to saturation (close to the maximum value of the D range), the D range is a sufficiently small range that can cover the maximum photometric value, and the D range does not need to be changed. Therefore, if the photometric value is within the predetermined range that is close to the maximum value of the D range, the target D range is assumed to be the current D range in step S810. For example, assuming that the photometric value is 12 bits, if the highest photometric value is greater than or equal to 4095×9/10, the current D range is assumed to be maintained. This is a case in which if the current D range is 700%, the highest photometric value is equivalent to 630% to 700%.

If it is determined in the determination in step S809 that the highest photometric value is not within the predetermined range, the highest photometric value is lower than the maximum value of the D range, and thus in step S811, the D range is reduced by the fixed value α. Assuming that α is the current D range×1/20, if the current D range is 700%, the D range after being reduced is 665%. Note that the fixed value α is not limited to this value, and may be changed in accordance with the D range, or different values may be used in step S806 and step S811. Furthermore, in step S811, the target D range may be calculated from the highest photometric value. In that case, a D range that causes the highest photometric value to be 4095×19/20 may be used. In that case, the target D range (Dtarget) can be calculated using the current D range (Dnow) and the highest photometric value (Emax) by Expression 4.

$$D\text{target}=(D\text{now}\times E\text{max})/(4095\times 19/20) \quad \text{Exp. 4}$$

In steps S806 and S811, it is sufficient that target the D range can be increased or decreased.

Figure 9:
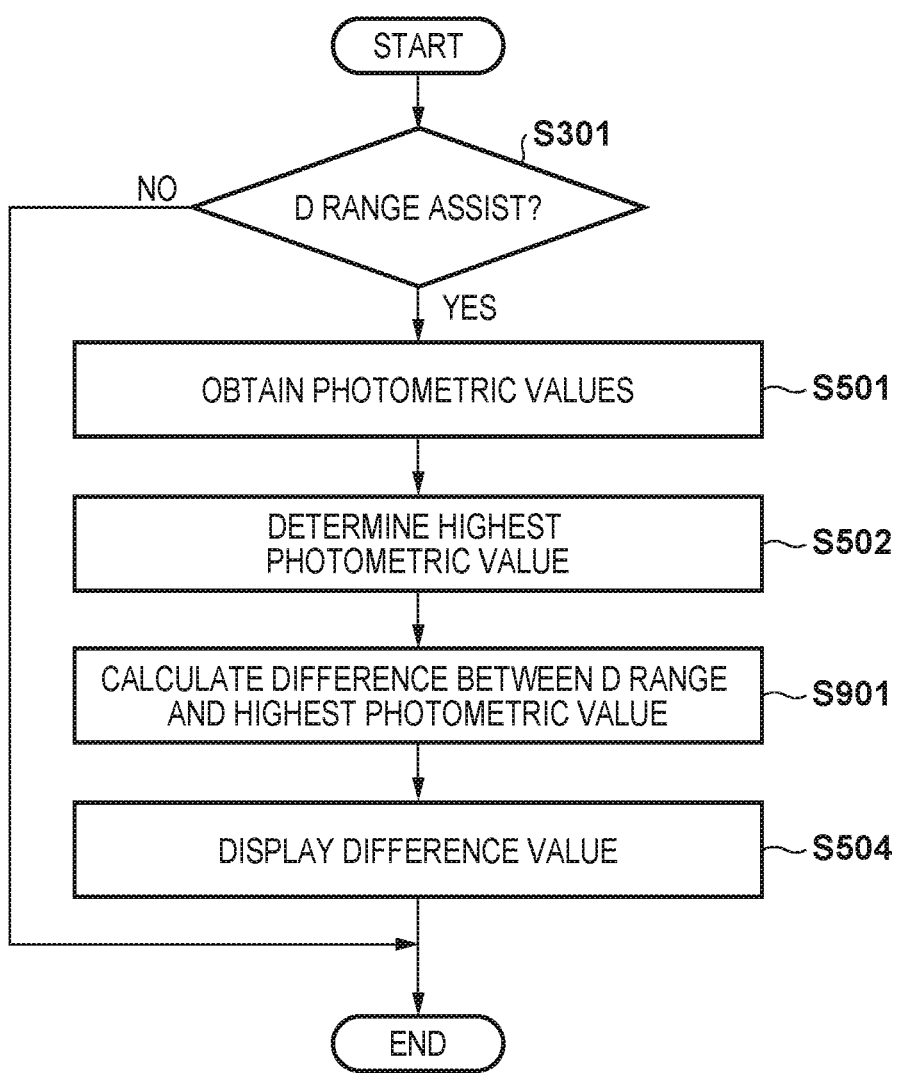
FIG. 9 is a flowchart showing display processing for displaying a difference value in the second embodiment.

Next, a method for displaying the difference value between the highest photometric value and the maximum value of the current D range (displaying a value indicating the degree of expansion of the D range necessary to be able to avoid blown-out highlights (overexposure)) in this embodiment will be described. FIG. 9 is a flowchart showing processing for displaying the difference value between the highest photometric value and the maximum value of the D range.

First, similarly to the first embodiment, in step S301, it is determined whether or not D range assist is enabled. If D range assist is disabled, this flow is ended without performing the following processing. If D range assist is enabled, similarly to the first embodiment, the D range is expanded in accordance with the operations in FIG. 8. Subsequently, in step S501, photometric values are obtained from the image data after expanding the D range and before passing through the gamma correction circuit, and in step S502, the highest photometric value is extracted. Next, in step S901, the difference between the changing target value that served as the target value when expanding the D range and this highest photometric value is calculated. The difference value is calculated by Expression 5 below.

$$\text{difference value}=\log_2(\text{highest photometric value}/(\text{maximum value}\times\text{current } D \text{ range}/\text{target } D \text{ range})) \quad \text{Exp. 5}$$

Lastly, in step S504, the difference value is displayed similarly to the first embodiment.

In the case of executing D range assist, if the above method is used for changing the D range, the D range can be changed to a D range that is close to the highest photometric value of the video image, and thus the change in S/N ratio before and after executing D range assist can be reduced as much as possible.

As described above, according to the above-described embodiments, the D range is expanded, and at the same time, the characteristics of the output for the incident light become substantially the same as before expanding the D range, thus making it possible to obtain a photometric value that had been saturated before expanding the D range without causing the video that is displayed to be unnatural. Therefore, the difference between the maximum value of the D range and the photometric value can be calculated using the photometric value and the current D range.

Note that in the above description, changing the apparent D range of a displayed image or video by adjusting the exposure and changing the sensitivity was referred to as expansion or reduction of the D range, but there is no limitation to this. For example, a configuration may be adopted in which actually changing the D range of the image sensor or the display image is expanding or reducing the D range in the digital video camera 100.

The present invention was described above in detail based on preferred embodiments thereof, but the present invention is not limited to these specific embodiments, and the present invention includes various modes without departing from the spirit of the invention. The above-described embodiments may be partially combined as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-115037, filed Jun. 5, 2015 which is hereby incorporated by reference herein in its entirety.

What is claimed is:

1. An image capturing apparatus comprising:
   an image capturing unit configured to capture an object image and output an image signal;
   at least one processor configured to execute a program stored in at least one non-transitory memory so as to function as units comprising:
   (1) an expander configured to expand a dynamic range of the image signal from the image capturing unit;
   (2) a tone correction unit configured to perform tone correction on the image signal;
   (3) a detection unit configured to detect signal values of a region within a screen corresponding to the image signal outputted from the image capturing unit after the expander expands the dynamic range by a predetermined amount; and (4) a control unit configured to, in a case where the dynamic range is expanded by the predetermined amount, change a characteristic of the tone correction so as to suppress change in a display image which is displayed on a display unit caused by change in the dynamic range by the predetermined amount, wherein the control unit changes the characteristic of the tone correction such that, even if a level of an input signal of the image signal is changed by the expansion of the dynamic range, a level of an output signal of the image signal obtained by performing the tone correction on the input signal does not change.

2. The image capturing apparatus according to claim 1, wherein the expander expands the dynamic range to a maximum dynamic range that can be set with the image capturing apparatus.

3. The image capturing apparatus according to claim 1, wherein the expander expands the dynamic range by a constant changing amount that is smaller than a changing amount for changing the dynamic range to a maximum dynamic range that can be set with the image capturing apparatus.

4. The image capturing apparatus according to claim 1, wherein the detection unit divides the image signal within the screen into a plurality of regions, and detects a highest value among signals in each of the plurality of regions.

5. The image capturing apparatus according to claim 4, wherein the at least one processor further functions as a calculator configured to calculate a difference between the highest value detected by the detection unit and a maximum value of a signal that can be expressed within the dynamic range before being expanded by the expander.

6. The image capturing apparatus according to claim 5, wherein the control unit causes the display unit to display the difference.

7. The image capturing apparatus according to claim 6, wherein the control unit causes the display unit to display a frame indicating a region that has the highest value detected by the detection unit among the plurality of regions, and the difference.

8. The image capturing apparatus according to claim 6, wherein the at least one processor further functions as a selection unit configured to select whether or not to display the difference on the display unit.

9. The image capturing apparatus according to claim 1, wherein the control unit changes the characteristics of the tone correction such that a level of an output signal obtained by performing the tone correction on a first value which indicates a maximum value of the input signal of the image signal corresponding to the dynamic range which is not expanded coincides with a level of an output signal obtained by performing the tone correction on an input signal corresponding to the first value in the dynamic range which has been expanded, whereby a portion of the display image after expanding the dynamic range that is substantially the same as a portion of the display image before expanding the dynamic range becomes saturated.

10. The image capturing apparatus according to claim 1, wherein the control unit changes the characteristic of the tone correction according to an exposure condition in image capturing of a subject performed by the image capturing unit, such that the display image is not changed before and after expanding the dynamic range.

11. A method for controlling an image capturing apparatus that includes an image capturing unit configured to capture an object image and output an image signal, the method comprising:

expanding a dynamic range of the image signal from the image capturing unit;

performing tone correction on the image signal;

detecting signal values of a region within a screen corresponding to the image signal outputted from the image capturing unit after the dynamic range is expanded by a predetermined amount in the expanding; and changing, in a case where the dynamic range is expanded by the predetermined amount, a characteristic of the tone correction so as to suppress change in a display image which is displayed on a display unit caused by change in the dynamic range by the predetermined amount, wherein in the changing, the characteristic of the tone correction is changed such that, even if a level of an input signal of the image signal is changed by the expansion of the dynamic range, a level of an output signal of the image signal obtained by performing the tone correction on the input signal does not change.

12. A non-transitory computer-readable storage medium that stores a program for causing a computer to execute a method for controlling an image capturing apparatus, the method comprising:

expanding a dynamic range of an image signal from an image capturing unit;

performing tone correction on the image signal;

detecting signal values of a region within a screen corresponding to the image signal outputted from the image capturing unit after the dynamic range is expanded by a predetermined amount in the expanding; and changing, in a case where the dynamic range is expanded by the predetermined amount, a characteristic of the tone correction so as to suppress change in a display image which is displayed on a display unit caused by change in the dynamic range by the predetermined amount, wherein in the changing, the characteristic of the tone correction is changed such that, even if a level of an input signal of the image signal is changed by the expansion of the dynamic range, a level of an output signal of the image signal obtained by performing the tone correction on the input signal does not change.

* * * * *